US006905550B2

(12) United States Patent
Labib

(10) Patent No.: US 6,905,550 B2
(45) Date of Patent: Jun. 14, 2005

(54) METHOD OF REMOVING ORGANIC MATERIALS USING AQUEOUS CLEANING SOLUTIONS

(75) Inventor: Mohamed Emam Labib, Princeton, NJ (US)

(73) Assignee: Princeton Trade & Technology, Inc., Princeton, NJ (US)

( * ) Notice: Subject to any disclaimer, the term of this patent is extended or adjusted under 35 U.S.C. 154(b) by 0 days.

(21) Appl. No.: 08/974,148

(22) Filed: Nov. 19, 1997

(65) Prior Publication Data

US 2003/0192572 A1 Oct. 16, 2003

Related U.S. Application Data

(63) Continuation of application No. 08/643,690, filed on May 6, 1996, now abandoned.

(51) Int. Cl.[7] .............................................. C23G 1/02
(52) U.S. Cl. ........................... 134/2; 134/3; 134/22.17; 134/22.19; 134/40; 134/41; 510/109; 510/161
(58) Field of Search ........................... 134/2, 3, 22.13, 134/22.14, 22.17, 22.19, 40, 41; 252/175, 206, 207, 95, 142, 156; 510/108, 109, 161

(56) References Cited

U.S. PATENT DOCUMENTS 5,196,134 A * 3/1993 Jackson ...................... 252/103
5,215,675 A * 6/1993 Wilkins et al. .............. 252/100
5,302,311 A * 4/1994 Sugihara et al. ............ 252/102
5,445,761 A * 8/1995 Shah et al. .................. 510/109
5,634,980 A * 6/1997 Tomita et al. ................. 134/18
5,725,678 A * 3/1998 Cannon et al. ........... 134/22.19

OTHER PUBLICATIONS

Brant et al, "Aqueous–Based Cleaning with Hydrogen Peroxide", J. Environ. Sci. Health, A31(9), 1996, pp2409–2434.

Zhang et al, "Hydrogen Peroxide Cleaning of Asphalt from Surfaces: Effect of Temperature", AiChE Summer National Meeting, Boston, MA, Jul. 30–Aug. 2, 1995.

* cited by examiner

*Primary Examiner*—Peter A. Hruskoci
(74) *Attorney, Agent, or Firm*—Merchant & Gould P.C.

(57) ABSTRACT

Removal of water-insoluble organic residues from inorganic surfaces can be accomplished in aqueous cleaning solutions containing an oxidant at a preselected temperature wherein the pH is adjusted with respect to the isoelectric point of the surface material to be removed so that the pH is above the pK, and the isoelectric point of the surface for acid materials, and below the PKa and the isoelectric point of the surface for basic materials. Surfactants can also be added to the cleaning solution.

12 Claims, 3 Drawing Sheets

METHOD OF REMOVING ORGANIC MATERIALS USING AQUEOUS CLEANING SOLUTIONS

This is a continuation of U.S. application Ser. No. 08/643,690 filed May 6, 1996 now abandoned.

This invention relates to a method of cleaning using water-based cleaning solutions. More particularly, this invention relates to a method of removing organic residues from inorganic surfaces using water-based solutions.

BACKGROUND OF THE INVENTION

The conventional wisdom is that organic solvents are required to remove most organic residues from the surfaces of equipment used to make organic chemicals, pharmaceuticals and foodstuffs. Organic residues are generally non-polar, or only slightly polar, and thus aqueous solutions do not wet the residues and do not remove them from equipment surfaces. organic solvent cleaning works by solubilizing organic residues; an organic residue is contacted with a quantity of organic solvent until all of the residue has dissolved. Depending on the particular organic residue, one or several organic solvents may be required to thoroughly clean equipment surfaces made of metal, ceramic, glass or polymers. Organic solvents in general use for removing organic residues include petroleum fractions, chlorinated hydrocarbons, toluene, acetone, alcohols, esters and the like.

However, environmental laws and regulations that regulate the use and emissions of organic solvents into the atmosphere are becoming more stringent, and more expensive disposal is required, thus making the use of organic solvents for cleaning more expensive. On the other hand, regulations from the Federal Drug Administration (FDA) and other agencies that monitor the pharmaceutical industry are also requiring a higher level of cleanliness for the manufacture of pharmaceutical products. A very high level of cleanliness for equipment must be ensured for each batch of material produced. Depending on the organic residue present, one or several organic solvents may be required to thoroughly clean the equipment. Organic residues that include ionizable functional groups, such as carboxylic acid groups, hydroxy groups or amine groups, adhere strongly to metal and glass surfaces.

Certain organic materials are water soluble, and thus water-based solutions can be used to remove water soluble organic materials from various surfaces. However, most organic materials are insoluble in water and thus washing in water does not remove these insoluble organics from surfaces.

Thus water-based cleaning solutions that can effectively remove organic residues from the equipment used to make organic chemical products and pharmaceuticals would be highly desirable.

SUMMARY OF THE INVENTION

In accordance with the present invention, organic materials which are non-polar and insoluble in water are reacted to form polar materials that can be removed from metal. ceramic, glass or polymeric surfaces using water-based cleaning solutions.

The water-based cleaning solutions of the invention contain an oxidant that adjusts the oxidation potential of aqueous cleaning solutions and a pH adjusting agent, and optionally a surfactant. Contact between the present cleaning solutions and insoluble organic residues are continued at a preselected temperature until the non-polar residues are converted to polar residues which can be solubilized or loosened from various inorganic surfaces and rinsed away with water.

Water-insoluble organic residues to be removed from inorganic surfaces to which they adhere are taken into the aqueous cleaning solution of the invention as particulates, rather than solubilized as is done using organic solvents.

DETAILED DESCRIPTION OF THE INVENTION

Figure 1:
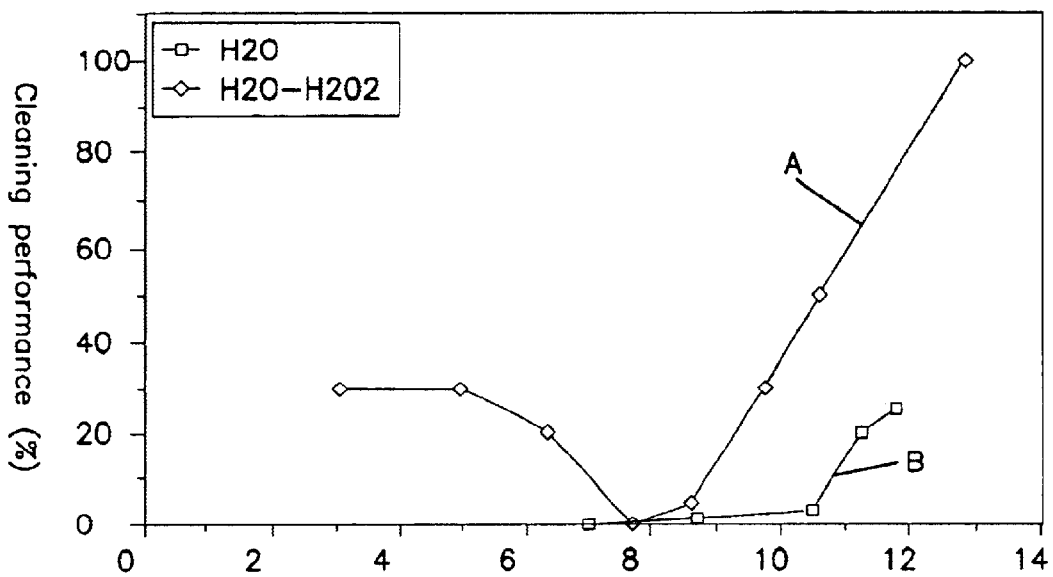
FIG. 1 is a graph of cleaning performance versus pH for diphenyl amine on stainless steel.

The surface chemistry of substrates such as stainless steel and other metals, ceramics such as alumina and zirconia, dielectrics such as quartz and glass and the like, depends on the chemistry of their surface oxides and hydroxides. Adhesion of various insoluble organic materials follows acid-base reactions. The mechanism of adhesion between an organic material and a surface in aqueous solution will be explained using stainless steel as an example. Solid surfaces such as stainless steel have surface oxide and hydroxide groups present. In an aqueous environment, several layers of water become hydrogen-bonded to the hydroxylated surface. The hydroxyl groups can be ionized at the solid-water interface, as

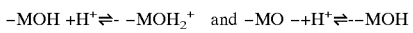

Thus the ionization depends on the pH of the aqueous solution. For oxide, there is a pH at which the number of positive charges equals the number of negative charges at the surface, which is defined as the isoelectric point of the surface (IEP). If the pH is lower than the IEP, the solid surface is positively charged. If the pH is higher than the IEP, the solid surface is negatively charged.

The isoelectric points of several solids useful herein are given below in Table I.

TABLE I

| Surface | IEP |
| --- | --- |
| stainless steel | 8.5 |
| quartz | 2.5 |
| molybdenum | 3.7 |
| aluminum | 9.0 |
| titanium | 6.0 |
| tantalum | 5.2 |

Thus in order to repel a material (organic residue) from a particular surface, both should have the same charge sign. If they do not, the organic residue will be attracted to, and adhere to, the metal or glass surface, and cleaning will not take place.

To accomplish cleaning of an insoluble organic acid, the pH of the solution should be higher than the $pK_a$ of the acid and the IEP of the surface to be cleaned. To accomplish cleaning of an organic base, the pH of the surface should be lower than the $PK_a$ of the organic base and the IEP of the solid surface. Weakly ionized materials such as diphenyl amine, can be cleaned using the present invention. Further, ionizable materials having a high molecular weight hydrophobic moiety, not cleanable in water, can also be cleaned in accordance with the present invention. In order for cleaning to occur, the interface between the organic residue and the solid surface must be in a state of net electrostatic repulsion for cleaning to be possible. Using these criteria, a determination of whether effective cleaning can be accomplished, and the pH needed, can be made.

The most important ingredient of the present cleaning solution is the oxidizing agent that produces an oxidation potential for a particular organic residue and will generate polar functional groups in the residue. The oxidation potential can be varied in accordance with the type of oxidant and its concentration in the aqueous cleaning solution, and it must be higher than the minimum oxidation potential required to oxidize the particular organic residue sought to be removed.

The pH is another important criterion for the present aqueous cleaning solutions. The pH level of the cleaning solution must be such that the electrostatic charge sign of the surface to be cleaned remains the same during cleaning. The dissociation of surface hydroxides on the substrate in an aqueous solution takes place at the isoelectric point, when the surface has zero charge. In order for cleaning to occur, the pH of the cleaning solution must be greater than the isoelectric point for the cleaning of acid-type materials, and lower than the isoelectric point for the cleaning of basic-type materials. The pH level should also be adjusted so as to avoid corrosion of the metal surfaces to be cleaned at too high a pH, and to avoid etching of glass surfaces to be cleaned, i.e., at too high or too low a pH.

The oxidation potential and pH can be selected so they operate in the passivation region of metal surfaces, such as stainless steel. The formulations can be tailored to the corrosivity of other metals as well, such as copper or aluminum. The oxidation potential can be adjusted by adding peroxides, permanganates, periodates and bromates, and by the addition of an oxidizing ion such as cermo ions in small amounts. If the solution oxidation potential does not provide an immediate response to the oxidation potential at the interface between the residue and the solid surface to be cleaned, the level of the oxidant must be adjusted and checked periodically during the cleaning process.

A conventional surfactant or detergent can also be added to the present cleaning solutions. The amount and type of surfactant can also be varied so as to increase the surface charge of the residue with respect to the surface charge of the surface to be cleaned. When the particles of residue are taken into the cleaning solution, the surfactant type and amount are adjusted so the particles do not readily re-deposit on the surfaces being cleaned. The surfactant also must be non-reactive with the quantity of oxidant used in the cleaning solution.

When cleaning is done below the IEP, i.e., the residue behaves as an organic base (positively charged), a mixture of cationic and nonionic surfactants are effective for non-soluble residues that generate a positive charge during cleaning, including amines or materials that generate amines. For example, for cleaning amine residues, cationic surfactants of the type $$R+N+CH_3Cl$$

wherein R is an alkyl group suitably of 8-16 carbon atoms can be employed. One example is hexadecyltrimethylammonium chloride at a level of about 0.1-10%. The cationic surface can be mixed with a nonionic surfactant, such as a monolaurylether of polyethylene glycol, used as a wetting agent. These surfactants also stabilize organic residues dislodged during the cleaning. The nonionic surfactant can be present in amounts of 0.1-5%.

When cleaning is done above the IEP, when the residue behaves as an organic acid, a mixture of anionic and nonionic surfactants can be used. Suitable anionic surfactants include long chain alkyl-substituted sulfonic acids, such as dodecylbenzosulfonic acid, in an amount of about 0.1-10%.

When cleaning is required at a neutral pH or at about the IEP, nonionic surfactants alone can be used. These surfactants promote the wetting of the inorganic surfaces, and can be used at a level of about 0.1-5% added to the standard cleaning solution at a hydrogen peroxide concentration of about 5%.

When cleaning is required under acidic pH conditions, the pH can be adjusted between 3 to 5 with citric acid for example at a temperature of about 75° C. The concentration of hydrogen peroxide in that case is preferably increased to between 5-15%. Difficult to clean materials such as non-wettable oils on glass, stainless steel or ceramic surfaces, can be removed with such a solution, particularly if ultrasonic agitation is also used.

A combination of an anionic surfactant and a cationic surfactant can also be used at a high (10.5) pH. The pH can be maintained at a high level with the addition of ammonium hydroxide or sodium hydroxide. If required, a silicone defoaming agent can also be employed.

Regardless of the choice of surfactant, non-foaming surfactants should be chosen, or a defoaming agent should be added, such as cetyl alcohol.

The temperature of the cleaning solution during cleaning operations should be generally between about 40° C. to 100° C. Within this temperature range, generally an increase in temperature increases the rate of removal of the organic residues from substrate surfaces. If the temperature is high enough to melt the organic residue, cleaning is easier since fluids are removed faster than solid organic materials using the present cleaning solutions.

Mechanical force can also be applied to aid in the removal of organic residues from substrate surfaces. In general, removal of organic residues from a surface is aided by the use of mechanical agitation, such as the use of jets, or stirring, or ultrasound agitation, all of which improve the rate of residue removal, particularly for stubborn residues such as charred sugars, polymers and silicone grease.

In order to ensure an optimum level of cleaning activity, the pH, oxidation potential, temperature and agitation parameters must be maintained and monitored. Timely addition of reagents and the maintenance of temperature and agitation will maintain the effectiveness of the present cleaning solutions so that the maximum amount of residue may be removed from surfaces in a minimum amount of time, while avoiding the use of excess environmentally unsafe oxidant materials.

One of the major benefits of the present cleaning technology is that the rate of cleaning is remarkably increased, often by a factor of ten. This can be seen in FIG. 1, which compares the cleaning performance for removing diphenyl amine from a stainless steel surface using a 4.5% aqueous solution of hydrogen peroxide at a temperature of 45° C. Curve A shows cleaning performance of this solution after ten minutes at various pH, versus water alone (curve B). It is apparent that above a pH of 8, the removal of the diphenyl amine is very rapid in the solution of the invention. Partially ionizable residues can also be cleaned more rapidly when peroxide solutions of the invention are employed.

Suitable oxidants useful in the present water-based cleaning solutions include peroxides, perborates, percarbonates and the like, as well as other materials that can change the oxidation potential of aqueous solutions. A widely available, non-toxic, inexpensive and easy to use oxidant is hydrogen peroxide. Hydrogen peroxide dissociates upon reaction to produce water and oxygen, both innocuous, and no solids are formed that could interfere with the cleaning of substrates. Organic peroxides such as peracetic acids, or peroxybenzoic acid, and tetrabutyl peroxy compounds are also useful and the latter can diffuse into polymeric matrices and interstices. The selection of the peroxide to be used is chosen based on the nature of the residue. Other widely available and inexpensive materials, such as hypochlorite solutions (bleach) are corrosive and generate particulates. Thus hypochlorites are not preferred. Perborates and percarbdnates must be used above the temperatures at which they spontaneously dissociate.

In addition to cleaning water insoluble organic materials, organic materials that are soluble in water can form insoluble materials when they are exposed to elevated temperatures. For example, cooking foods at too high a temperature will form insoluble residues that can no longer be removed with aqueous solutions, even those including surfactants. The present cleaning solutions will remove these charred or chemically altered materials.

The invention will be further described by the following examples. However, the invention is not meant to be limited to the details described therein.

In the examples, small glass and metal substrates were used. The metal substrates were 316 (SS316) grade stainless steel, a high carbon, high chromium, high nickel corrosion resistant steel. The test plates used were 2 inches square and 1/16 inch thick. These stainless steel substrates were cleaned in preparation for the testing as follows: the test substrates were rinsed with acetone, dipped in trichloroethylene for 30 seconds, rinsed with methanol and then with acetone, dipped in HCl for 30 seconds, dipped in nitric acid for 30 seconds, rinsed with hot deionized water, then with acetone and dried.

The glass substrates were pyrex glass 3 inch squares 1/8 inch thick. These substrates were cleaned by first washing with detergent, dipping in chromic acid for 30 seconds, then in HCl for 30 seconds, rinsing with deionized water and drying.

Other test substrates were made from aluminum, molybdenum, tantalum, titanium, and zirconia cut into 2 inch squares.

Various organic materials were deposited on the test substrates as will be detailed in the examples below. Various cleaning solutions and deposition methods were used for the removal of the organic materials.

The degree of cleaning was determined for the metal substrates by visual inspection. The degree of cleaning was determined by dividing the amount of cleaned area by the total area of the sample. The visual inspection can be augmented using a microscope.

Figure 2:
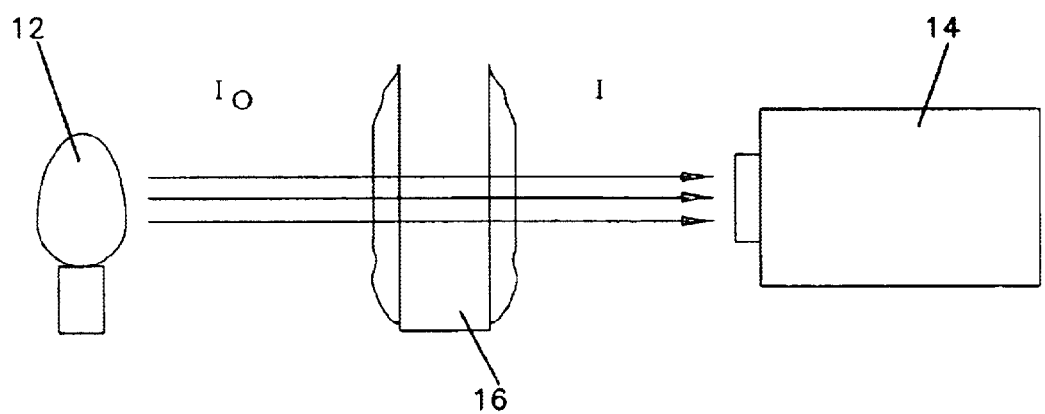
FIG. 2 is a schematic view of a system used to measure cleaning of glass substrates.

Cleaning of glass substrates was measured by optical spectroscopy. The system used is shown in FIG. 2. Referring to FIG. 2, a source of monochromatic light 12 is mounted so that the light passes to a photospectrometer 14. The incoming light beam (400 nanometers) was passed through a quartz cuvette 16 (a quartz container for the solutions to be measured) and the absorbance measured to calibrate the clean cuvette. After depositing the organic residue and cleaning the glass substrate, absorbance of the resultant cuvette was measured again. The difference in the mass of deposited material before and after cleaning is calculated as a measure of cleaning performance in accordance with the following equation:

$$C_p(\%) = (A_o - A_t)/(A_o - A_c) \times 100$$

wherein $A_o$ is absorbance before cleaning, $A_t$ is absorbance at time "t" (after cleaning) and $A_c$ is absorbance of the clean quartz cuvette.

Example 1. Cleaning of dehydrated carbohydrate

A 1 Molar solution in water of glycerol was made by heating in water at 80° C. for one hour. The glycerol deposited onto a stainless steel substrate, was heated at 200° C. for one hour. A sticky residue formed which was not removable in cold water, but was removable in warm (60° C.) water after 10 minutes.

The sticky residue was removed immediately in a solution containing 4.5% of hydrogen peroxide and 4.5% of ammonium hydroxide in water (standard cleaning solution, hereinafter SCS) at 60° C.

Example 2. Cleaning of insoluble esters

A 0.5 Molar solution of isoamyl acetate in acetone was made at 80° C. and evaporated to leave a residue on a test substrate. This residue was heated at 180° C. for one hour to form a brownish sticky residue that could not be removed in either cold or warm water.

The residue was removed in SCS at 60° C. within one minute.

Example 3. Cleaning of cycloketones

Cyclohexanone was deposited on warmed (70° C.) substrates. This material was not removable with cold or warm water, but was removed in less than one minute in SCS at 60° C.

Example 4. Cleaning of epoxy resin

Bisphenol A and epichlorohydrin were mixed together on a substrate and dried to form an adherent clear epoxy resin layer. This residue could only be removed by treatment with SCS at 70° C. with scrubbing.

Example 5. Cleaning of silicone grease

A commercial silicone grease was deposited on a substrate, which was not removable with cold or warm water. However, it was removed in SCS at 70° C. after about 10 minutes.

Example 6. Cleaning of insoluble organic acid on stainless steel

Figure 3:
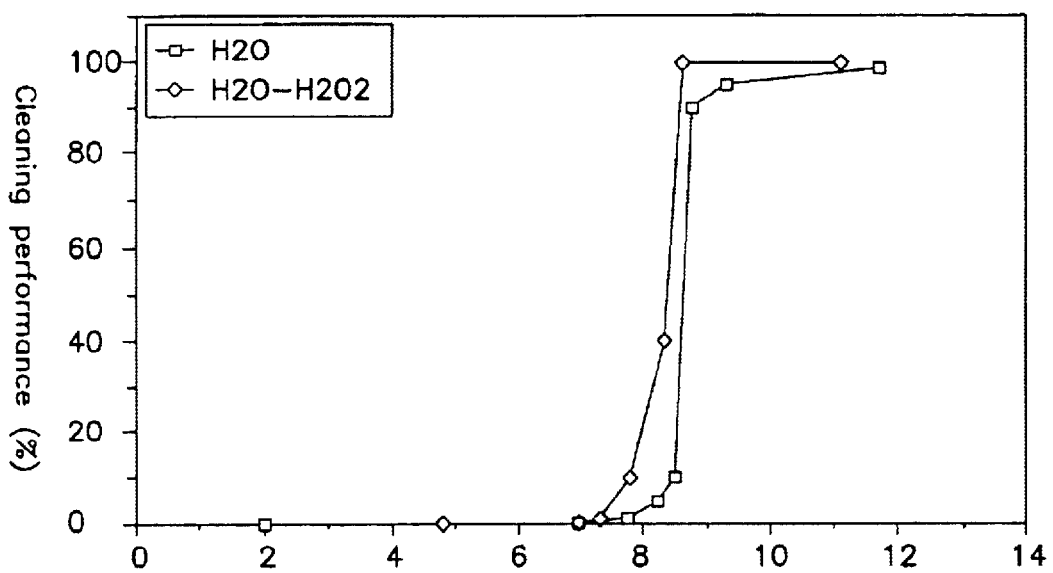
FIG. 3 is a graph of cleaning performance versus pH for stearic acid on stainless steel.

A 1 Molar solution of stearic acid in boiling isopropanol was used to deposit stearic acid on glass. Removal of stearic acid from the substrate was strongly pH dependent, as shown in FIG. 3, a graph of cleaning performance versus pH at 55° C. measured after 10 minutes.

It is apparent that no cleaning took place up to a pH of 8 for SCS and above 8 for water.

Example 7. Cleaning of aromatic amine on stainless steel

Diphenyl amine was deposited from 2-propanol solution onto a stainless steel substrate. The deposit was not wetted nor cleanable in cold water. At a temperature above about 52° C., the material melted and could be removed.

Example 8. Cleaning of aromatic amine on glass

Diphenyl amine was deposited as in Example 7 onto glass substrates.

Figure 4:
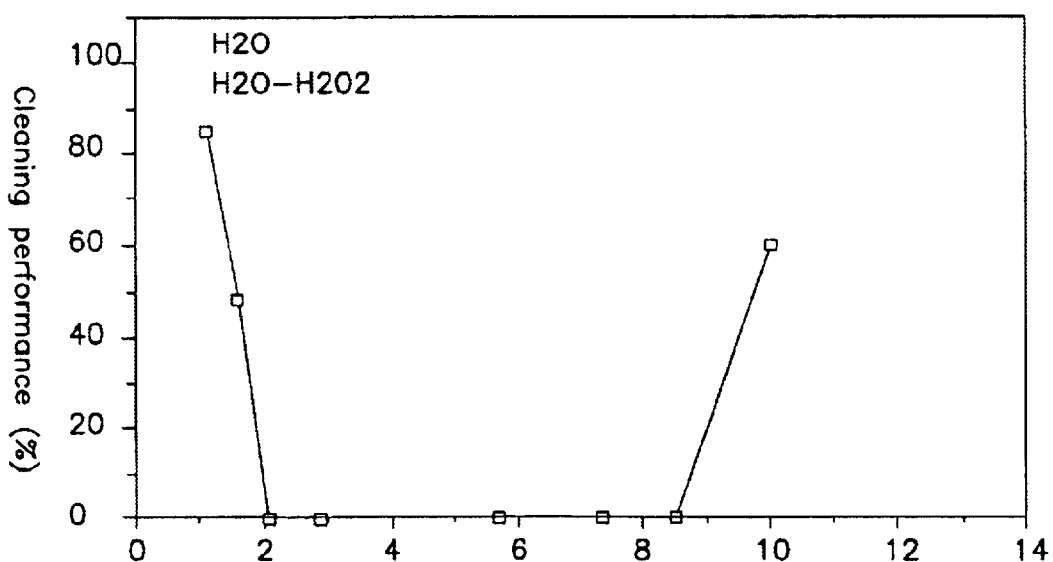
FIG. 4 is a graph of cleaning performance versus pH for diphenyl amine on glass.

As can be seen in FIG. 4, a graph of cleaning performance versus pH, the substrates were not cleanable except at a pH below 2. At high pH, the substrate was etched.

Example 9. Cleaning of stearic acid from various substrates

Stearic acid was deposited as in Example 6 onto different metal substrates. Removal from aluminum in hot water only occurred at a pH over 11, which caused corrosion of the substrate.

Stearic acid was deposited onto molybdenum and was removable from aqueous solution at 55° C. at a pH over 6.

On tantalum, stearic acid was only removable from aqueous solution at 55° C. at a pH over 5.

On titanium, stearic acid was only removable from aqueous solution at 55° C. at a pH over 6.

Example 10. Cleaning of stearic acid versus temperature

Figure 5:
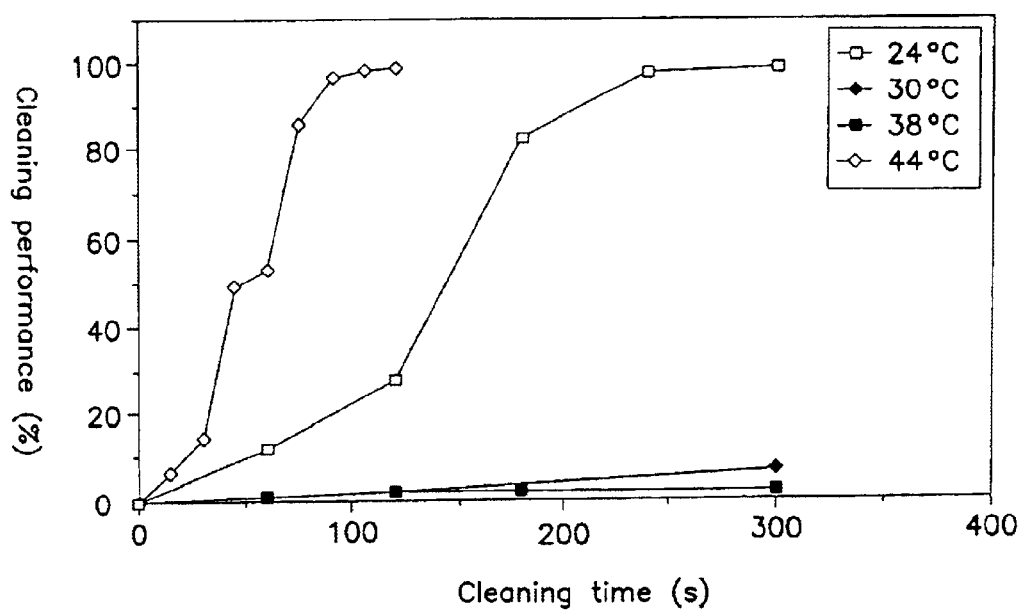
FIG. 5 is a graph of cleaning performance versus time for different temperatures for stearic acid on glass.

Stearic acid was deposited onto glass substrates and removed with hydrogen peroxide solution (4.5%) at various temperatures. The results are shown in FIG. 5 wherein the pH was maintained at 7. It can be seen that temperature has a marked influence on removal of the organic residue.

Example 11. Cleaning of burned oil on a zirconia surface

Oil was deposited on zirconia and burned. The residue was removed by a cleaning solution of 10% hydrogen peroxide, 2% hexadecyl trimethyl ammonium chloride, 2% cationic surfactant and 0.5% of cetyl alcohol as a defoaming agent. The pH of the solution was 3.5. Maintaining the solution at 75° C., the organic residue was removed from the zirconia surface.

Example 12. Cleaning of hydrophobic resinous oils on a zirconia surface

A cleaning solution containing 7% hydrogen peroxide, 5% anionic surfactant and 2% cationic surfactant in water was adjusted to a pH of 10.5, which is above the IEP of zirconia. Silicon defoaming agents can be added as required. This solution removed the resinous residue from a zirconia surface.

Example 13. Cleaning of alucose and charred sugars on a zirconia surface

A glucose solution was heated to 180° C. and deposited on a zirconia substrate. Cleaning was accomplished using potassium periodate at a basic pH of 10.5 and a temperature of 75° C.

Example 14. Cleaning of charred starch on metal and glass surfaces

A starch was heated to a brown color in an oven and deposited on 316 stainless steel and glass. This material was very difficult to remove with SCS but the addition of a small amount of alcohol aided the cleaning process.

Example 15. Cleaning of ethyl cellulose on a stainless steel surface

An ethyl cellulose latex containing plasticizers such as dibutyl sebacate or trimethyl citrate was deposited on 316 stainless steel and made to adhere to the substrate by heating in an oven at 80° C. for 18 hours. This residue is not cleanable in either hot or cold water, or in conventional alkaline surfactants. This very inert material was cleaned with SCS alone at 75° C. This material was also cleaned with SCS to which phosphate and anionic surfactants were added at a pH of 10.5, in 10 minutes.

Although the invention has been illustrated in terms of specific embodiments, it will be apparent to those skilled in the art that various insoluble organic materials can be removed from glass and metal surfaces in like manner. The pH and temperature can be readily optimized in accordance with the above examples. Thus the invention is to be limited only by the scope of the appended claims.

I claims:

1. A method of removing water-insoluble organic material from an norganic surface coated with the water-insoluble organic material in pharmaceutical manufacturing equipment, the method comprising the following steps in sequence:

(a) contacting said inorganic surface in pharmaceutical processing equipment with an aqueous solution containing about 4.5 to about 15% by weight of hydrogen peroxide and a hydroxide in an amount so as to obtain a pH of above 7;

(b) agitating said aqueous solution onto said surface until said organic material is loosened from the inorganic surface at a temperature of from about 40 to about 100° C., forming organic residue in said aqueous solution; and (c) rinsing away the organic residue; wherein the organic material includes a water insoluble cycloketone.

2. A method according to claim 1 wherein said surface is selected from the group consisting of a glass, a ceramic, a metal and a metal oxide.

3. A method according to claim 1 wherein said organic material includes a water insoluble polymer.

4. A method according to claim 1 wherein said organic material includes a water insoluble resin.

5. A method according to claim 1 wherein said organic material includes a silicone grease.

6. A method according to claim 1 wherein said organic material includes a water insoluble organic acid.

7. A method of removing water-insoluble organic material from an inorganic surface coated with the water-insoluble organic material in pharmaceutical manufacturing equipment, the method comprising:

(a) contacting said surface in pharmaceutical processing equipment in an aqueous solution containing about 4.5 to about 15% by weight of hydrogen peroxide and an acid in an amount so as to obtain an acidic pH;

(b) agitating said aqueous solution against said surface until said organic material is loosened from the inorganic surface at a temperature of from about 40 to about 100° C., forming organic residue in said aqueous solution; and (c) rinsing away the organic residue.

8. A method according to claim 7 wherein said organic material includes a water insoluble organic amine.

9. A method of removing water-insoluble organic material from an inorganic surface coated with the water-insoluble organic material, the method comprising the following steps in sequence:

(a) contacting said inorganic surface with an aqueous solution containing about 4.5 to about 15% by weight of hydrogen peroxide and a hydroxide in an amount so as to obtain a pH of above 7;

(b) agitating said aqueous solution onto said surface until said organic-material is loosened from the inorganic surface at a temperature of from about 40 to about 100° C., forming organic residue in said aqueous solution, and wherein said organic material includes a water insoluble cycloketone; and (c) rinsing away the organic residue.

10. A method of removing water-insoluble organic material from an inorganic surface.coated with the water-insoluble organic material, the method comprising the following steps in sequence:

(a) contacting said inorganic surface with an aqueous solution containing about 4.5 to about 15% by weight of hydrogen peroxide and a hydroxide in an amount so as to obtain a pH of about 7;

(b) agitating said aqueous solution onto said surface until said organic material is loosened from the inorganic surface at a temperature of from about 40 to about 100°

C., forming organic residue in said aqueous solution, and wherein said organic material includes water insoluble cellulose; and (c) rinsing away the organic residue.

11. A method of preparing a clean surface from an inorganic surface coated with a water-insoluble organic material consisting essentially of the following steps in sequence:

(a) contacting said inorganic surface with an aqueous solution consisting essentially of about 4.5 to about 15% by weight of hydrogen peroxide and a hydroxide in an amount so as to obtain a pH of above 7;

(b) agitating said solution onto said surface until said organic material is loosened from the inorganic surface at a temperature of from about 20 to about 100° C., forming detached particles in said aqueous solution, and (c) rinsing away the detached organic particles; wherein said organic material includes water insoluble cellulose.

12. A method according to claim 11 wherein said surface is selected from the group consisting of a glass, a ceramic, a metal and a metal oxide.

* * * * *